United States Patent
Haverkamp et al.

(10) Patent No.: US 6,390,563 B1
(45) Date of Patent: May 21, 2002

(54) SOUND REDUCING WHEEL RIM

(75) Inventors: Michael Haverkamp, Cologne; Michael Koenig, Dormagen, both of (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,351

(22) Filed: May 9, 2000

(30) Foreign Application Priority Data

May 20, 1999 (EP) .............................................. 99109895

(51) Int. Cl.⁷ ............................................... B60B 21/00
(52) U.S. Cl. ........................ 301/6.91; 152/381.5; 295/7
(58) Field of Search ....................... 301/95, 6.91; 295/7; 152/381.5, 381.6; 181/207, 208

(56) References Cited

U.S. PATENT DOCUMENTS

| | | | | |
|---|---|---|---|---|
| 2,033,863 A | * | 3/1936 | Piron .............................. | 295/7 |
| 4,431,227 A | * | 2/1984 | Howell ........................... | 295/7 |
| 4,896,921 A | * | 1/1990 | Sato et al. ................... | 152/381.5 |
| 5,538,058 A | * | 7/1996 | Aloy ........................ | 152/381.5 |
| 5,899,253 A | * | 5/1999 | Marron et al. ............. | 301/6.91 |
| 6,106,075 A | * | 8/2000 | Suenaga ......................... | 295/7 |

FOREIGN PATENT DOCUMENTS

| | | | | |
|---|---|---|---|---|
| DE | 2601724 | * | 7/1976 | .............. 152/381.6 |
| EP | 99109895.5 | | 5/1999 | |
| JP | 63137005 | | 6/1988 | |
| JP | 01115704 | | 5/1989 | |
| JP | 06106903 | | 4/1994 | |
| WO | WO 98/33666 | | 8/1998 | |

OTHER PUBLICATIONS

Science and Invention Encyclopedia, pp. 2474 and 2475; 1987.*

* cited by examiner

*Primary Examiner*—Russell D. Stormer
(74) *Attorney, Agent, or Firm*—Gregory P. Brown

(57) ABSTRACT

A wheel rim (1) with a circumferential surface (4) has a tire that can be mounted thereon. A sound-absorbing material (6) rests on the wheel rim (1) and is arranged underneath a surface-forming structure (8) extends transversely over the entire width of the sound-absorbing material. A recessed receptacle (5) for the sound-absorbing material (6) is formed in the circumferential surface (4). The upper side (8a) of the surface-forming structure (8) coincides with the predetermined course (7) of the circumferential surface (4).

10 Claims, 3 Drawing Sheets

SOUND REDUCING WHEEL RIM

FOREIGN PRIORITY

The present invention claims priority under §119 to European Patent Application EP99109895.5 filed May 20, 1999.

TECHNICAL FIELD

The invention relates generally to wheels for automotive vehicles and more specifically to a wheel incorporating sound-absorbing material which rests on the wheel rim to reduce noise to the passenger compartment.

Tire noise is generated by resonance in the air-filled cavity between the wheel rim and the tire. Attempts to eliminate stressful noise to which passengers in the passenger compartment are subjected, by means of sound-proofing measures on the bodywork, have not led to the desired result. Attempts to avoid the formation of cavity resonances per se have likewise not achieved their aim. Thus, for example, it was not possible to prevent resonance by increasing the rigidity of the wheel rim.

Attempts have also been made to prevent resonance by vulcanizing or bonding a damping band in on the inner wall of the tire. However, it has been found that a reduction in stressful noise cannot be achieved in this way either. To reduce noise radiation from tires, EP-0 029 120 B1 has proposed to secure sound-absorbing materials on the tire beads or on the wheel rim and have them project into the interior of the tire. This is intended to a large extent to allow retrofitting to existing tires or elements associated with them. However, the disadvantage here is that when the sound-absorbing materials are secured on the tire beads, these must necessarily be exchanged as well when the tire is changed or, if they are secured on the wheel rim, they may easily be damaged when the tire is changed because they project into the interior of the tire.

SUMMARY OF THE INVENTION

Against this background, it is the object of the present invention to improve a wheel rim of the generic type in such a way that cavity resonance is eliminated without the sound-absorbing material being exchanged when a tire is changed or being exposed to the risk of damage.

According to the invention, this object is achieved in the case of a wheel rim of the type stated at the outset by virtue of the fact that a recessed receptacle for the sound-absorbing material is formed in the circumferential surface, and the radially outward side of the surface-forming structure coincides with the nominal shape of the circumferential surface.

It has been found that substantial elimination of resonance in the cavity between the tire and the wheel rim is achieved with the arrangement according to the invention of the sound-absorbing material in a depression in the circumferential surface of the wheel rim. It is not necessary for this purpose that the sound-absorbing material should project into the interior of the tire. The width of the receptacle can be 5 cm and its depth about 2 cm, for example. Since, according to the invention, the upper side of a surface-forming structure arranged above the sound-absorbing material reestablishes the actual nominal shape of the wheel rim, the space which is also available in the case of wheel rims known from the prior art, without the arrangement of sound-absorbing material, is available for the application of the tool for a tire change, with the result that the sound-absorbing material is protected from damage by the tool.

In a preferred embodiment of the invention, the receptacle runs continuously around the wheel rim. This embodiment is particularly suitable for steel rims of sheet-metal construction, for example, since only one additional rolling operation is necessary to form the receptacle during manufacture.

The surface-forming structure is preferably a perforated cover which extends continuously in the circumferential direction. This ensures maximum protection for the sound-absorbing material.

As an alternative, however, it is also possible for the surface-forming structure to be designed as ribs which are arranged at a distance from one another in the circumferential direction and extend transversely to the circumferential direction. By means of these measures, the maximum possible free surface of the sound-absorbing material is obtained in order to expose as large a proportion as possible of the surface of the sound-absorbing material to the sound waves. In addition, this reduces consumption of material.

As a further advantageous development of the invention, the surface-forming structures are welded to the circumferential surface. If the wheel rim and the surface-forming structures are produced from steel, a secure connection between the wheel rim and the surface-forming structures can in this way be made in a simple manner. A particularly preferred method for making the connection is spot welding.

In an alternative, likewise advantageous embodiment of the invention, fixing grooves, in which the surface-forming structure is secured by means of a clip or adhesive joint, are provided on both sides of the receptacle. This method of fixing proves to be advantageous especially in the case of wheel rims and surface-forming structures made of aluminum.

In another, likewise advantageous, development of the invention, the receptacle is formed by individual accommodation chambers, and the surface-forming structure is formed by the upper sides of webs which extend transversely to the circumferential direction and separate the accommodation chambers from one another. This configuration is intended especially for forged or cast wheel rims. By means of these measures, it is possible in a simple manner to prevent the sound-absorbing material from sliding along the circumference of the wheel rim.

A thin perforated film is preferably applied to the upper side of the sound-absorbing material, the film being 0.05 mm thick. The film can be applied to the inside of the surface-forming structure, for example. The arrangement of the film increases the durability of the sound-absorbing material since local friction loads between the sound-absorbing material and the surface-forming structure are avoided.

In the case of perforated surface-forming structures and/or films, the total area of the perforation openings preferably amounts to more than 40% of the covering surface. This ensures complete elimination of resonance in all cases.

BRIEF DESCRIPTION OF THE DRAWINGS

The invention will be explained in greater detail below by way of example with reference to the drawing, in which.

DETAILED DESCRIPTION OF THE PREFERRED EMBODIMENT

Figure 1:
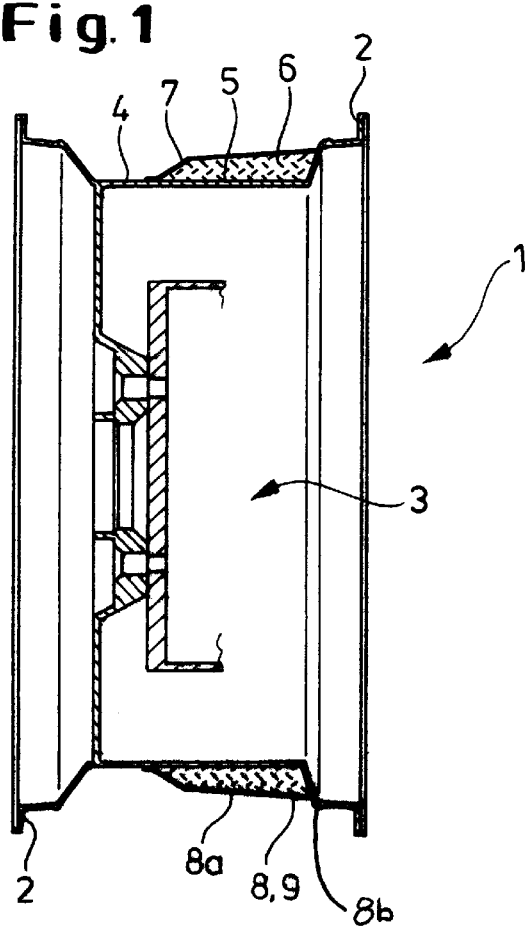
FIG. 1 shows a cross-sectional view of a first embodiment of a wheel rim according to the invention, in which the surface-forming structure is designed as a perforated metal sheet and is welded to the wheel rim.

The exemplary embodiment illustrated in the figures of wheel rims 1 according to the invention have not only the known arrangement for placement of the tire beads of tubeless tires and for fixing on the axles of a vehicle 2 and 3 but also, in their circumferential surface 4, a receptacle 5 for sound-absorbing material 6, this receptacle being designed as a depression extending radially inwardly relative to the actual nominal shape 7 of the wheel rims 1. The receptacle 5 for the sound-absorbing material 6 is arranged predominantly in the region of the circumferential surface 4 which faces the motor vehicle in the installed state of the wheel rim 1. Thus, the sound absorbing material is in wheel cavity defined between the rim and the tire to absorb noise thereon. In the example illustrated, the width of the receptacle 5 is about 5 cm and its depth is about 2 cm. The receptacle or depression 5 is bounded on its upper side by a surface-forming structure 8, the upper side 8a of which forms or re-establishes this nominal shape 7.

Figure 2:
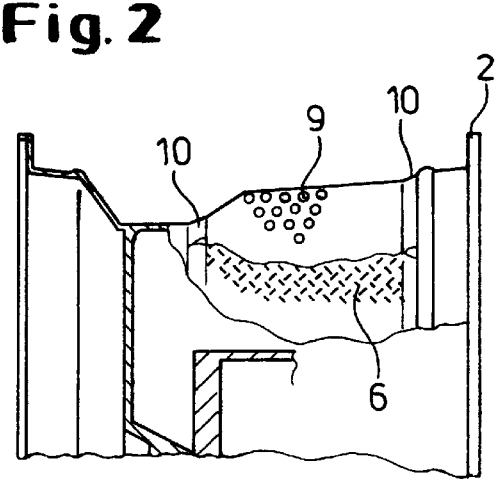
FIG. 2 is an embodiment similar to that in FIG. 1, on an enlarged scale and in partial perspective view, in which the perforated metal sheet is secured in grooves in the wheel rim.
Figure 3:
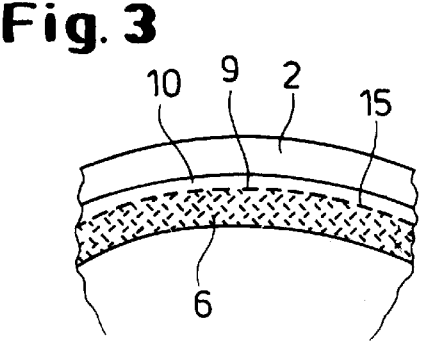
FIG. 3 shows a section along the Line III—III in FIG. 2.

In the case of the exemplary embodiments illustrated in FIGS. 1 to 3, the surface-forming structure 8 is designed as a perforated metal sheet, i.e. perforated plate, which is continuous in the circumferential direction and extends transversely to the circumferential direction over the entire depression 5. The sound-absorbing material 6 arranged in the depression 5 is thus completely covered by the perforated plate 9, the sound-absorbing material 6 filling the space under the perforated plate 9. The proportion of the total area of coverage accounted for by the perforations is about 40%.

According to FIG. 1, the perforated metal sheet is a steel perforated plate 9, the thickness of which is preferably 2.0 to 4.0 mm and which is welded to the wheel rim 1, e.g. by spot welding. This embodiment is used primarily suitable for steel wheel rims.

In the exemplary embodiment illustrated in FIGS. 2 and 3, the wheel rim 1 has a groove 10 on both sides of the depression 5, into which groove the two edges of the perforated plate 9 project. The perforated plate 9 can be secured there by means of a clip 8b or snap connection or even by means of an adhesive joint. This embodiment is employed predominantly with wheel rims 1 made of aluminum. In this case, the perforated plate 9 is also produced from aluminum and has a thickness of, preferably, 3.0 to 5.0 mm.

Figure 4:
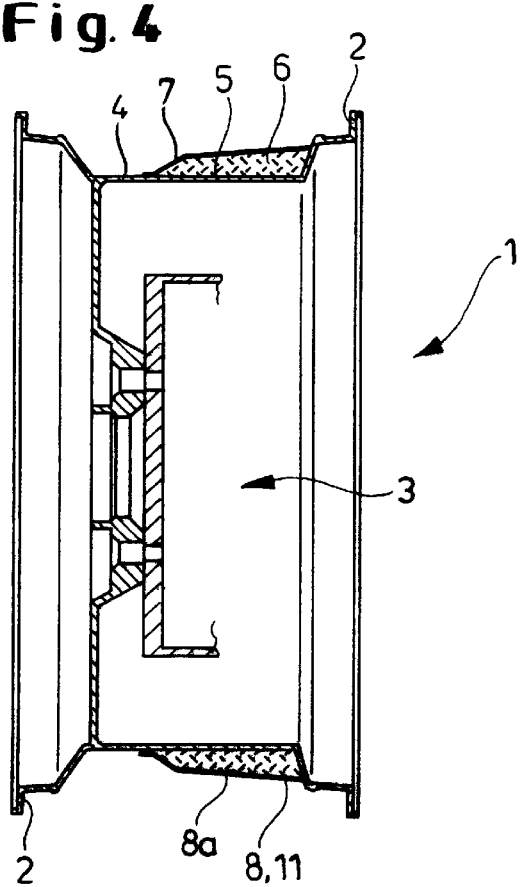
FIG. 4 shows a cross-sectional view, similar to that in FIG. 1, of another embodiment of a wheel rim, according to the invention, in which the surface-forming structure is formed by a plurality of ribs which are welded to the wheel rim.
Figure 5:
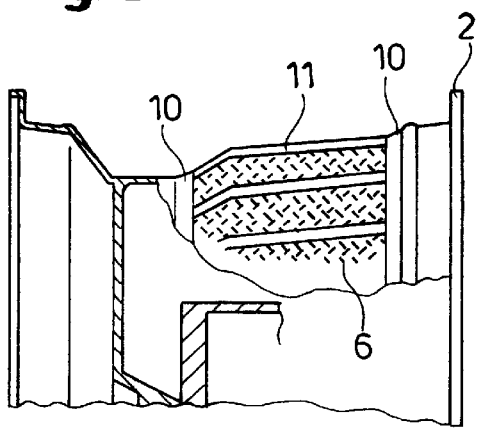
FIG. 5 shows an embodiment, similar to that in FIG. 4, on an enlarged scale and in partial perspective view, in which the ribs are secured in grooves in the wheel rim.
Figure 6:
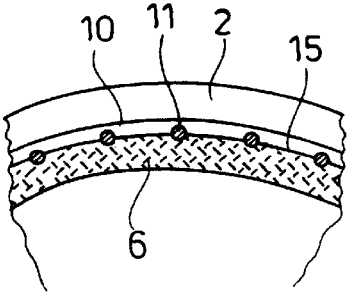
FIG. 6 shows a section along the line IV—IV in FIG. 5.

In the exemplary embodiments illustrated in FIGS. 4 to 6, the receptacle 5 for the sound-absorbing material 6 is embodied in the same way as in the exemplary embodiments in accordance with FIGS. 1 to 3. Here, the sound-absorbing material 6 is covered by leaf-type ribs 11, the underside of which rests on the sound-absorbing material 6 and the upper side of which forms the nominal shape 7 of the wheel rim 1. The ribs 11 are arranged at a distance from one another in the circumferential direction and extend transversely to the circumferential direction over the entire width of the sound-absorbing material 6. In these exemplary embodiments too, the ribs 11 can be produced from steel, and preferably are produced from steel in the case of steel rims, and can be welded to the wheel rim 1 or, in the case of aluminum rims, produced from aluminum and inserted into grooves 10 formed on both sides of the receptacle and bonded in or secured by means of a clip or snap joint. The cross section of the ribs 11 is circular in the example illustrated.

Figure 7:
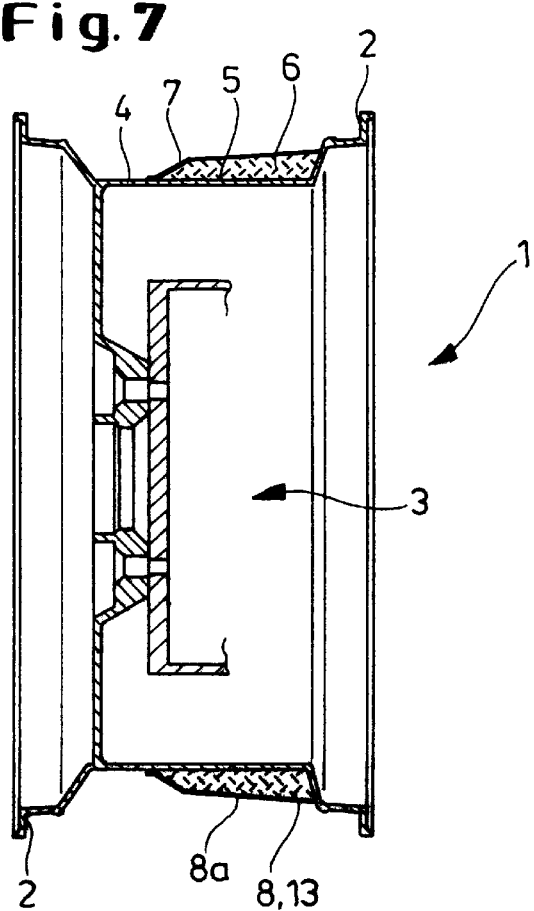
FIG. 7 shows a cross-sectional view, similar to that in FIGS. 1 and 4, of another embodiment of a wheel rim according to the invention, in which the wheel rim is produced as a die casting and has integrally cast webs.
Figure 8:
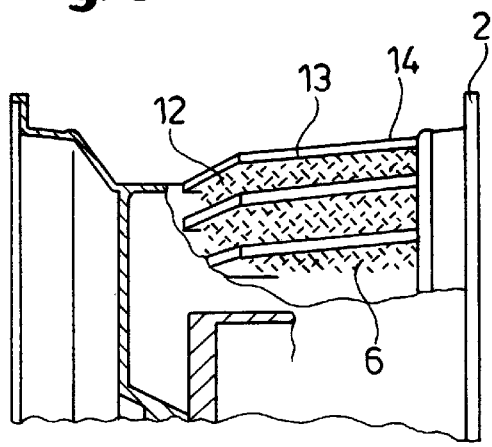
FIG. 8 shows the upper portion of the wheel rim in FIG. 7 on an enlarged scale and in partial perspective view.
Figure 9:
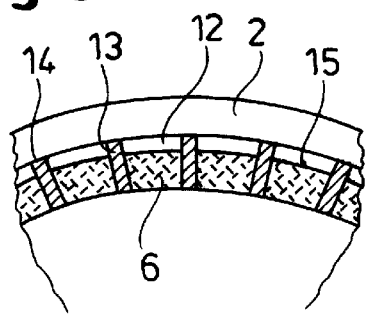
FIG. 9 shows a section along the line IX—IX in FIG. 8.

If the wheel rims 1 are produced as die castings, e.g. from aluminum, it is possible—as illustrated in FIGS. 7 to 9—for individual accommodation chambers 12 separated from one another by webs 13 or ribs extending transversely to the circumferential direction to be formed. The webs 13 extend in the radial direction from the base of the receptacle 5 as far as the nominal shape 7 of the wheel rim 1, the upper side 14 of the webs 13 forming this nominal shape 7. The sound-absorbing material 6 can be secured in the accommodation chambers 12 by means of an adhesive joint.

In all exemplary embodiments, the upper side of the sound-absorbing material 6 can be covered with a thin perforated film 15, the thickness of which is, for example, 0.05 mm, in order to act as an anti-adhesive agent to prevent foreign bodies from sticking to the sound-absorbing material 6 and prevent the material from fraying. In the exemplary embodiment in accordance with FIGS. 1 to 6, the Teflon film 15 is arranged between the sound-absorbing material 6 and the perforated plate 8 or ribs 11 and is also secured on these.

While particular embodiments of the invention have been shown and described, numerous variations and alternate embodiments will occur to those skilled in the art. Accordingly, it is intended that the invention be limited only in terms of the appended claims.

What is claimed is:

1. A wheel rim assembly comprising:
   a wheel rim having circumferential surface, said circumferential surface having a recessed receptacle disposed radially inwardly from a nominal shape of the wheel rim;
   a surface-forming structure having an upper surface defining the nominal shape of the wheel rim, said surface-forming structure extending transversely to the circumferential direction; and
   a sound-absorbing material disposed within the recessed receptacle, said sound-absorbing material having an upper side adjacent to the surface-forming structure and a lower side adjacent to the rim;
   wherein the surface-forming structure comprises a perforated cover which extends continuously in the circumferential direction over the recessed receptacle and the sound absorbing material therein.

2. A wheel rim assembly comprising:
   a wheel rim having circumferential surface, said circumferential surface having a recessed receptacle disposed radially inwardly from a nominal shape of the wheel rim;
   a surface-forming structure having an upper surface defining the nominal shape of the wheel rim, said surface-forming structure extending transversely to the circumferential direction, wherein the surface-forming structure is welded to the circumferential surface; and a sound-absorbing material disposed within the recessed receptacle, said sound-absorbing material having an upper side adjacent to the surface-forming structure and a lower side adjacent to the rim.

3. A wheel rim assembly comprising:

a wheel rim having circumferential surface, said circumferential surface having a recessed receptacle disposed radially inwardly from a nominal shape of the wheel rim;

a surface-forming structure having an upper surface defining the nominal shape of the wheel rim, said surface-forming structure extending transversely to the circumferential direction;

a sound-absorbing material disposed within the recessed receptacle, said sound-absorbing material having an upper side adjacent to the surface-forming structure and a lower side adjacent to the rim; and fixing grooves, in which the surface-forming structure is secured by a securing means.

4. A wheel rim assembly comprising:

a wheel rim having circumferential surface, said circumferential surface having a recessed receptacle disposed radially inwardly from a nominal shape of the wheel rim;

a surface-forming structure having an upper surface defining the nominal shape of the wheel rim, said surface-forming structure extending transversely to the circumferential direction;

a sound-absorbing material disposed within the recessed receptacle, said sound-absorbing material having an upper side adjacent to the surface-forming structure and a lower side adjacent to the rim; and a thin perforated film applied to the upper side of the sound-absorbing material.

5. The wheel rim as claimed in claim 4, wherein the perforated film comprises a covering surface having perforation openings, said perforation openings having an area greater than about 40% of the covering surface.

6. A wheel rim assembly comprising:

a wheel rim having a circumferential surface, said circumferential surface having a recessed receptacle formed therein, said receptacle disposed radially inwardly from the circumferential surface;

a surface-forming structure having an upper surface defining an outer side of receptacle, said surface-forming structure extending transversely to the circumferential direction, wherein the surface-forming structure is welded to the circumferential surface; and a sound-absorbing material disposed within the recessed receptacle and directly adjacent to the wheel rim.

7. A wheel rim assembly comprising:

a wheel rim having a circumferential surface, said circumferential surface having a recessed receptacle formed therein, said receptacle disposed radially inwardly from the circumferential surface;

a surface-forming structure having an upper surface defining an outer side of receptacle, said surface-forming structure extending transversely to the circumferential direction; and a sound-absorbing material disposed within the recessed receptacle and directly adjacent to the wheel rim; and fixing grooves, in which the surface-forming structure is secured by a securing means.

8. A wheel rim assembly comprising:

a wheel rim having a circumferential surface, said circumferential surface having a recessed receptacle formed therein, said receptacle disposed radially inwardly from the circumferential surface;

a surface-forming structure having an upper surface defining an outer side of receptacle, said surface-forming structure extending transversely to the circumferential direction;

a sound-absorbing material disposed within the recessed receptacle and directly adjacent to the wheel rim; and a thin perforated film applied to the upper side of the sound-absorbing material.

9. The wheel rim as claimed in claim 8, wherein the perforated film comprises a covering surface having perforation openings, said perforation openings having an area greater than about 40% of the covering surface.

10. A wheel rim and tire assembly having a cavity defined between the rim and the tire, assembly comprising:

a wheel rim having a circumferential surface, said circumferential surface having a recessed receptacle formed therein, said receptacle disposed radially inwardly from the circumferential surface;

a surface-forming structure having an upper surface defining an outer side of said receptacle, said surface-forming structure extending transversely to the circumferential direction, the surface-forming structure comprises a plurality of ribs spaced apart from one another in the circumferential direction and extending transversely to the circumferential direction completely axially across the receptacle to form accommodation chambers therein; and a sound-absorbing material disposed within the recessed receptacle within the cavity to absorb sound from within the cavity.

\* \* \* \* \*